(130.)  2 Sheets--Sheet 2.

S. H. RICHARDSON.

Improvement in Saw Mills.

No. 122,781.  Patented Jan. 16, 1872.

Witness

Inventor

122,781

UNITED STATES PATENT OFFICE.

SIMON H. RICHARDSON, OF BANGOR, MAINE.

IMPROVEMENT IN SAW-MILLS.

Specification forming part of Letters Patent No. 122,781, dated January 16, 1872.

*To all whom it may concern:*

Be it known that I, SIMON H. RICHARDSON, of Bangor, in the county of Penobscot and State of Maine, have invented a new and useful Improvement in Saw-Mills; and I hereby declare the following to be a full, clear, and exact description thereof, which will enable others to make and use the same, reference being had to the accompanying drawing, in which—

Figure 1:
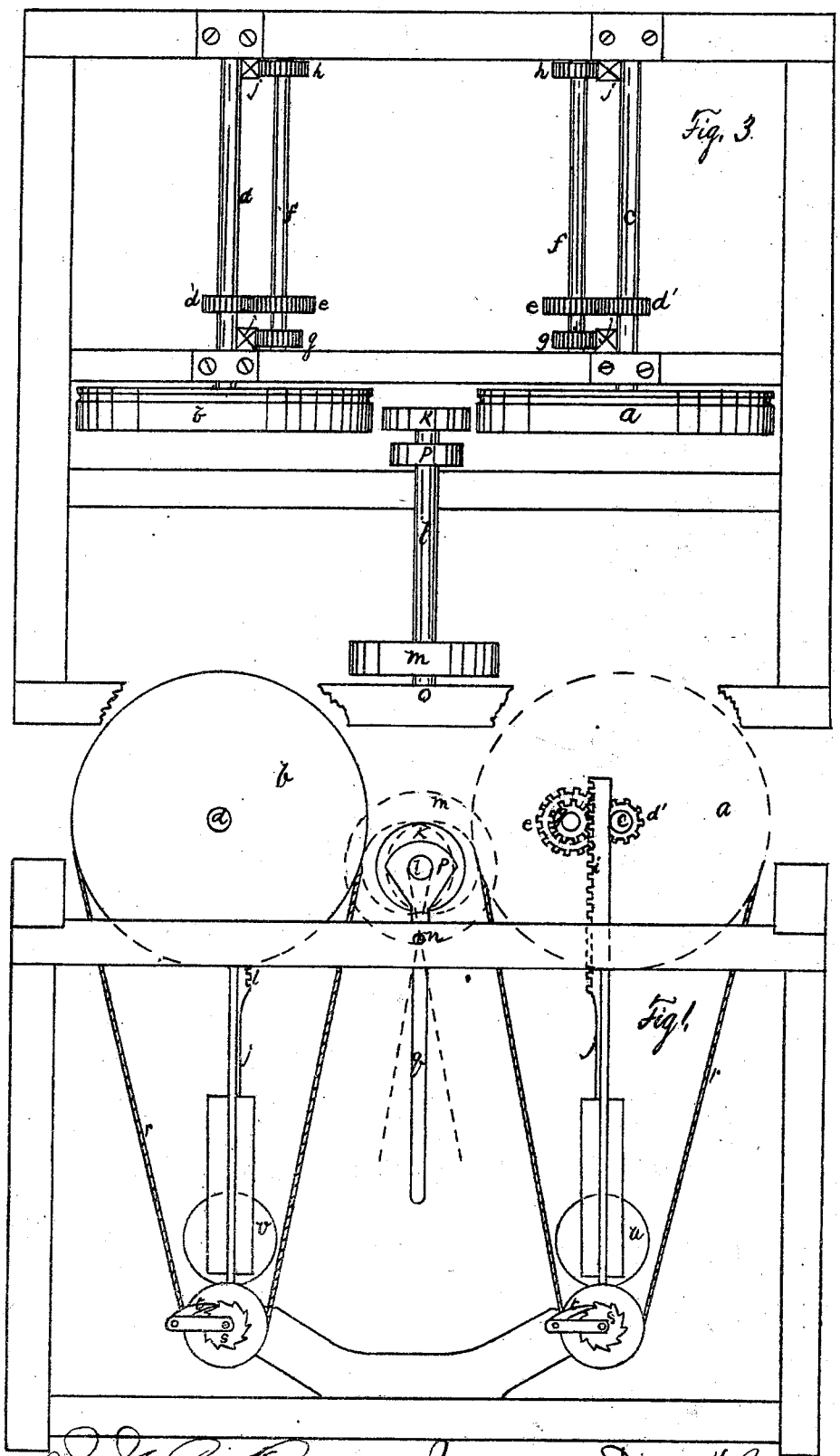
Figure 2:
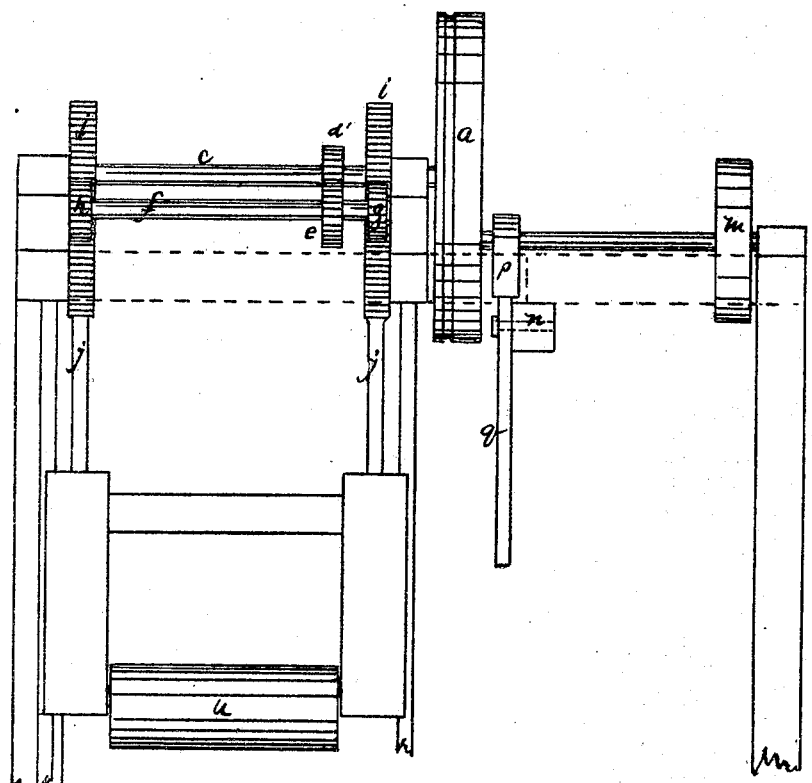

Figure 1 shows a side elevation of my invention; Fig. 2, a front view; and Fig. 3, a plan of same.

Same letters show like parts.

My invention aims at a simple and easily operating method of raising the presser-rolls of gang saw-mills, when a new log is about to pass under them. At present this is done by hand or by complicated and cumbrous machinery. My device will be easily understood by reference to the drawing.

At $a$ $b$ are two friction-wheels, situated above the gang upon shafts $c$ $d$, extending across the frame of the machine. Revolving the wheel $a$ raises the rear presser-roll $u$, and the revolution of the wheel $b$ lifts the forward roll $v$ by mechanism precisely similar. The following description of that acted upon by the wheel $a$ is applicable to either: Upon its shaft $c$ is a gear, $d'$, meshing into and giving motion to a gear, $e$, and shaft $f$, upon which it is placed. On this shaft $f$ are two other gears, $g$ $h$, meshing into racks $i$ $i$ upon the ends of rods $j$ $j$ which extend down to and connect with the frame of the presser-roll $u$ at each side. Upon giving revolution to the wheel $a$ motion is transmitted through its shaft $c$ and gear $d'$ to the shaft $f$ and gears thereon, and thence to the racks, rods, and presser-rolls frame, lifting the roll as before stated. Examination of the drawing will show a like connection of gears, shafts, &c., with the wheel $b$, by which it is enabled to raise the roll $v$ in like manner.

My improved method or device for communicating motion to either wheel $a$ or $b$, as desired, is as follows: Between them is placed a friction-wheel or truck, $k$, upon a shaft, $l$, on the opposite end of which is a band-pulley, $m$, giving it motion. This shaft $l$ has bearings $o$ $p$, of which $o$ is stationary; the other, $p$, being supported upon a rod or lever, $q$, pivoted at $n$ so as to allow its end of the shaft a slight horizontal motion. By means of the lever $q$ the truck $k$—kept in revolution by the band-wheel $m$—may be brought in contact with either friction-wheel $a$ or $b$, giving motion to either and the presser-roll with which it is connected, as herein described. To retain the rolls in position when raised each wheel $a$ and $b$ is provided with a rope, $r$, passing around it in such a way as not to interfere with the friction-truck $k$. These ropes pass around pulleys $w$ at the lower part of the gang, which pulleys have ratchets $s$ $s$ attached to them and pawls $t$ $t$ connected therewith, which prevent them turning while the friction of the rope $r'$ passing around the pulleys keeps the wheels $a$ and $b$ steady in any desired position. Or the rolls may be kept up by holding the rope attached to their respective wheels $a$ or $b$ by hand.

If desired the shaft $f$ and its gears $g$ $h$ may be omitted, and the shafts $c$ $d$ provided with gears $g$ $h$, meshing directly into the racks on the rods $j$ $j$, dispensing with the gears $d'$ now on said shafts.

What I claim as my invention, and desire to secure by Letters Patent, is—

The device for raising the presser-rolls of saw-mills, when constructed substantially as herein set forth and shown, for the purposes specified.

SIMON H. RICHARDSON.

Witnesses:
WM. FRANKLIN SEAVEY,
J. Y. RICKER.

(130)